July 17, 1962 D. HARTWIG 3,044,080

COT CONSTRUCTIONS

Filed Sept. 24, 1958 4 Sheets-Sheet 1

INVENTOR.
DEWARD HARTWIG
BY
Marechal, Biebel, French & Bugg
ATTORNEYS

July 17, 1962 D. HARTWIG 3,044,080

COT CONSTRUCTIONS

Filed Sept. 24, 1958 4 Sheets-Sheet 2

INVENTOR.
DEWARD HARTWIG

BY

Marechal, Biebel, French & Bugg

ATTORNEYS

July 17, 1962 D. HARTWIG 3,044,080

COT CONSTRUCTIONS

Filed Sept. 24, 1958 4 Sheets-Sheet 3

INVENTOR.
DEWARD HARTWIG

BY

ATTORNEYS

INVENTOR.
DEWARD HARTWIG

BY

Marechal, Biebel, French & Bugg

ATTORNEYS 3,044,080

COT CONSTRUCTIONS

Deward Hartwig, 628 N. Clemens, Lansing 12, Mich.
Filed Sept. 24, 1958, Ser. No. 763,123
11 Claims. (Cl. 5—111)

This invention relates to cot constructions and more particularly to collapsible or foldable cots.

The principal object of the present invention is to provide cot constructions which can be quickly and easily collapsed into a compact form for storage or transportation.

It is a further object of the present invention to provide collapsible cot constructions having frames which include novel locking structure whereby the cot frame and supporting legs are made rigid to provide support without bending or swaying of the cot but without detracting from the comfort of the cot.

It is one of the constructional features of the cots of this invention that they can be made of sufficient width to accommodate or sleep two people in a "double bed" arrangement, and yet the final collapsed package is of minimum size and is in convenient shape when collapsed for either transporting or storing.

It is a further object of the invention to construct a collapsible cot from tubular members which form articulated sections of a frame. All the tubular members (in one embodiment of the invention) are caused to lie in side by side relation to become a bundle of approximately equal length rods with a plurality of folds of fabric held at their periphery on said tubular members making up sections of the frame.

It is an important feature of the present invention that the locking means for bracing the frame and support legs thereof while the cot is extended may be in the form of flexible braces and fastenings which prevent further extendible movement of the cots once they are extended for usage. The cot constructions may also be provided with further reinforcement structure which stiffen the cot members.

In a second embodiment of the invention, it is an object thereof to provide for collapsing of the cot by a folding movement wherein, starting with the two end sections, portions of the cot fold inwardly one section within the other, the inwardly folding sections meeting in the middle of the cot and forming utlimately a rectangular outline of relatively thin cross section, which can easily be stored in some convenient location such as a closet or the like or can be carried in a station wagon, automobile trunk, etc. This latter cot construction may also be fabricated from tubular members which are articulated to provide a frame, with end portions of the tubular members lying side by side to reinforce each other against buckling.

Other objects of the invention include the provision of suitable locking means, flexible braces and fastenings which allow necessary telescoping and pivotal movement of the cot construction in folding upon to a compact form, while at the same time in an extended position providing sufficient rigidity and stableness.

Other objects and advantages of this invention will be apparent from the following description, the accompanying drawings and the appended claims.

In the drawings—

Figures 1, 2, 3, 4, 5, 6:
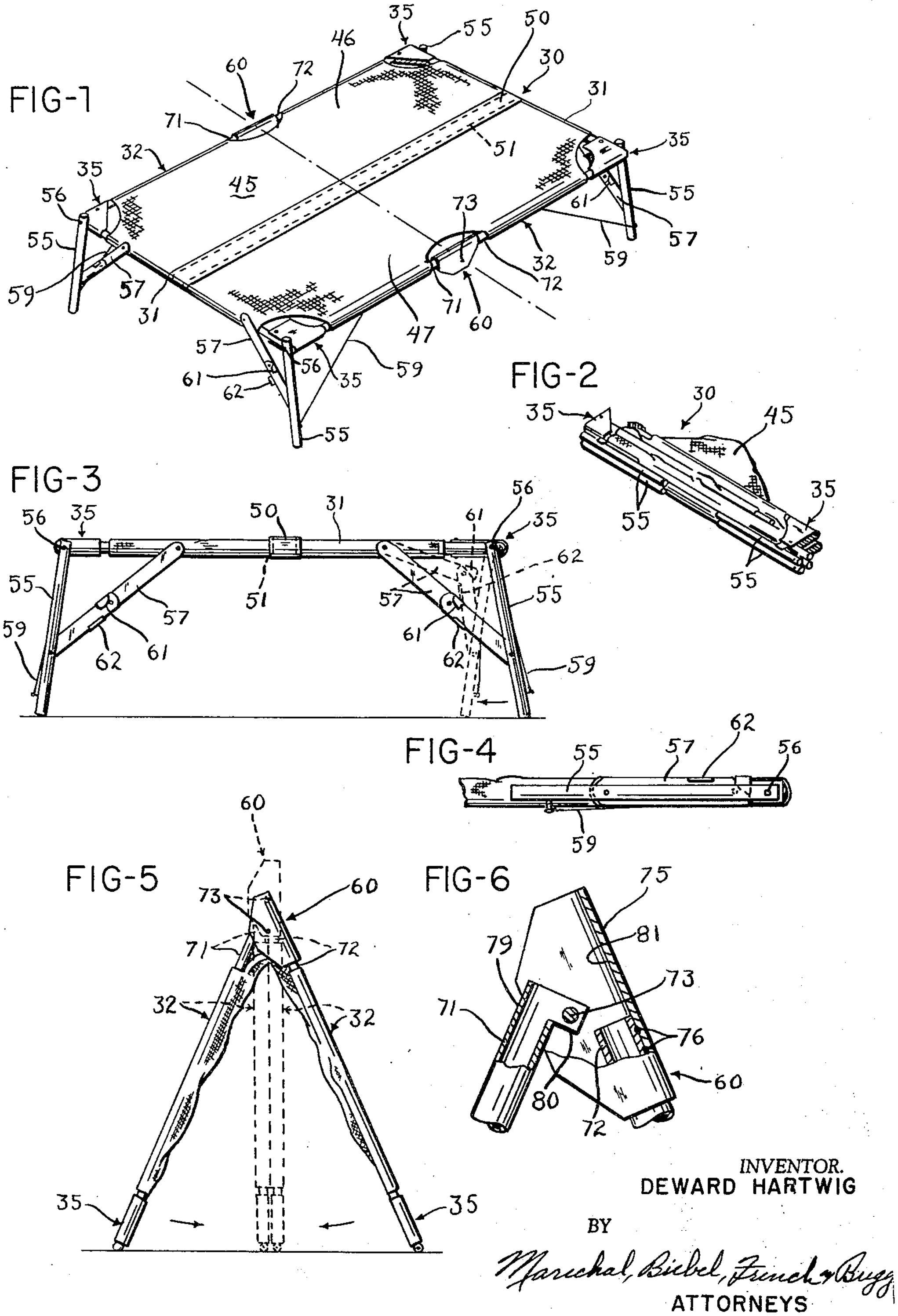
FIG. 1 is an isometric view of a cot forming one embodiment of the invention and shown in a fully extended or spread position ready for usage.
FIG. 2 shows the same cot in a fully collapsed position ready for storage or transportation.
FIG. 3 is an end view of the cot shown in FIG. 1, and illustrating at the right hand side thereof the support leg and flexible brace in the partially collapsed position indicated in dotted lines.
FIG. 4 is a partial fragmentary end view of the cot with the support leg fully retracted, this being the first step in the process of collapsing the cot.
FIG. 5 is a side view of the cot shown in FIG. 1 showing how the side of the cot frame is turned back on its hinge midway of the side thereof, the dotted lines indicating the fully collapsed position of the side members.
FIG. 6 is a detail view of the hinge midway in each of the sides of the frame, showing the relative positions of the parts as they are indicated in solid line in FIG. 5 with a portion of the pivot connection broken away to illustrate the parts.

Referring to the drawings, which illustrate preferred embodiments of the invention, the collapsible cot in FIGS. 1–12 is designated generally by reference numeral 30. The cot 30 includes a frame having identically constructed head and foot members 31 (also referred to hereinafter as end members), and identically constructed side members 32, the side and end members being joined through corner members 35 to form a rectangular frame. The frame is constructed in sections comprising tubular members which are commercially available, and may vary in diameter according to the strength properties desired.

The corner members 35 consist essentially of sheet metal reinforcement sides 37 and 38 which receive ends 40 and 41 of tubular members 31 and 32 respectively. The ends of head and foot tubular members 31 are welded directly to the plates 37 and 38 and are therefore rigid with the corner member while the side members 32 have pin connections 39 with the corner structures 35 which permits the tubular side members 32 to swing on the corner members. As will be described more fully later, this movement is permitted only when the cot has been previously folded in half at the midpoints of the side members 32.

A foldable fabric 45 is held at its periphery on the frame 31, 31—32, 32 and is stretched outwardly at its edges when the frame is in its extended position. The fabric is held under sufficient tension to form a suitable reclining surface which will not excessively dish or sag under the weight of an occupant or occupants. The area of the reclining surface as shown in FIG. 1 is considerably larger than that normally provided in the usual cot constructions, the purpose of this being to provide a substantially greater width providing two reclining surfaces 46 and 47, each of which is sufficient to provide a sleeping space. The cot is therefore suitable for two occupants, and the two sleeping areas are divided by a reinforcement 50 extending the length of the cot. The reinforcement 50 consists of lapped sections of the fabric which are stitched together, and if desired there may be included in the reinforcement portion 50 a flexible cable 51 or the like which will prevent excessive sagging at the middle of the cot tending to roll the two occupants one against the other.

While the composition of the fabric 45 is not a matter of critical importance, it must have certain properties such as being foldable and having satisfactory tear strength. It has been found that a canvas fabric is suitable for providing the necessary strength, and is sufficiently pliable to be folded in the many directions necessary for collapse of the cot. Also, webbing formed of plastic strips may be used as the equivalent of canvas in camping equipment and outdoor furniture of the general class of this invention.

At each of the four corners 35, a supporting leg 55 is pivoted on the frame 31, 31—32, 32 by pins 56. The legs 55 are pivoted in one extreme position to the angularity indicated in FIG. 3, and during collapsing movement the legs swing upwardly into the plane of the cot as shown partly in dotted line FIG. 3 and then to the position of FIG. 4. The legs 55 are tubular members having sufficient strength to elevate the cot and will carry the necessary load. The legs 55 in their spread position are not exactly upright, but instead are slightly off center in a vertical sense, so that each leg tends to pivot outwardly under load. Since the legs at each of the four corners are spread outwardly as described, then the legs tend to move in opposite directions under load thereby providing greater stability to the cot because the legs cannot be accidentally turned all in the same direction to cause collapse of the cot in the event that the cot is jarred.

Two flexible braces 57 and 59 are provided for each leg to limit outward pivotal movement of the legs 55 away from the frame. The brace 57 is a linkage type brace pivoted to the end members 31 and leg 55 respectively. Each of the braces 57 has a flange 61 limiting pivotal movement thereof in one direction, and a catch 62 which holds the folded brace while in its retracted position (FIG. 4) by contact with the support leg.

The leg 55 is further constrained by a flexible brace 59 which consists of a length of cable or wire rope fastened to the bottom of the leg 55 and at the other end to the side member 32. Other constructions of the brace 59 are available, it being understood that the particularly disclosed brace means is merely an example of suitable bracings for the leg. The two braces 57 and 59 will so stiffen each of the legs 55 against movement about the associated pins 56 so that the weight imposed on the cot will be supported by the legs 55 without their buckling or distorting.

The two side members 32 are jointed midway thereof on hinges 60 which permit the cot to be bent in half about an axis joining the hinges 60 shown in FIG. 1. The bending movement on hinge 60 about the bending axis is shown in FIG. 5 at about two-thirds completion, the dotted position in FIG. 5 being a side view of the cot with the bending fully completed. The two tubular sections 71 and 72 of each side member are fastened together by hinges 60, the section 71 being secured to the hinge 60 through a pin 73 (FIGS. 1, 5 and 6) which is received at its ends in a stamping 75 folded over the diameters of the tubular sections 71 and 72 to stiffen them against sidewise bending. Tubular member 72 is welded or soldered at 76 to the stamped plate 75.

The sides of the stamping 75 guide the hinge movement of the tubular sections 71 and 72 as the cot is caused to bend in half. It is important to note that the stamping 75 (by virtue of the sides thereof) will permit bending movement only on the bending axis but no other direction of movement is permitted. Referring to FIG. 6, the end 79 of the tubular section 71 has an ear 80 forming a transverse projection thereon for receiving the pin 73 thereby permitting the necessary hinge action between the two tubular sections 71 and 72 without the edges of end 79 binding at the undersurface 81. The tubular sections 71 and 72 after being doubled back (FIG. 5) are then folded in one over the other, the width of the end members being greater than the doubled over length of the side members 32 (see FIG. 7).

Figure 7:
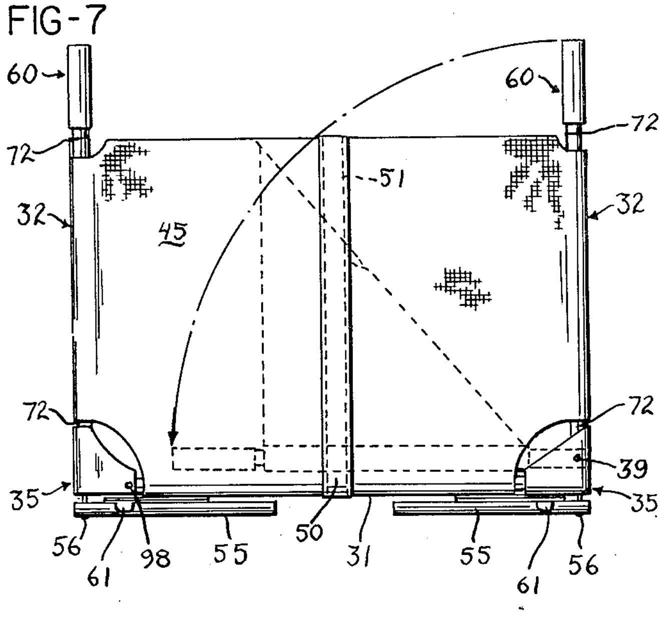
FIG. 7 is a view looking from the right hand side of FIG. 5 with the collapsing step of FIG. 5 fully completed, the right hand portion of FIG. 7 being then collapsed inwardly in the direction of the arrow.
Figure 8:
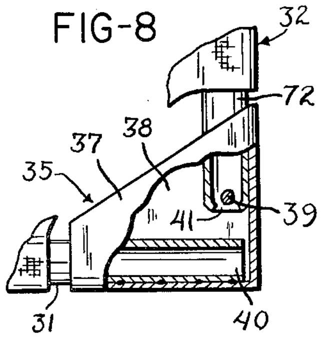
FIG. 8 is an enlarged detail view of a part of the cot corner in FIG. 7 with parts broken away to illustrate the pivotal connections permitting collapsing movement indicated in FIG. 7.
Figure 9:
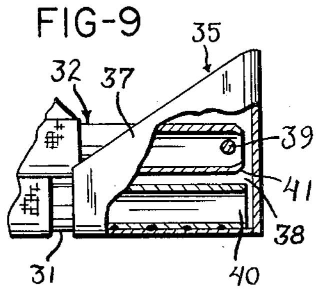
FIG. 9 is a detail view of the corner structure of FIG. 8 after the collapsing thereof.

FIG. 7 is a view from the right hand side of FIG. 5 after the bending of side members 32 is completed. The next succeeding collapsing stage depends upon the construction of corner members 35. With the cot as shown in FIG. 7, the two end members 31 lie in side by side relation, and once this is brought about, the sections 71, 72 can swing inwardly on their pivot connections 39 (FIGS. 8, 9) with the corner members 35.

Figures 10, 11, 12:
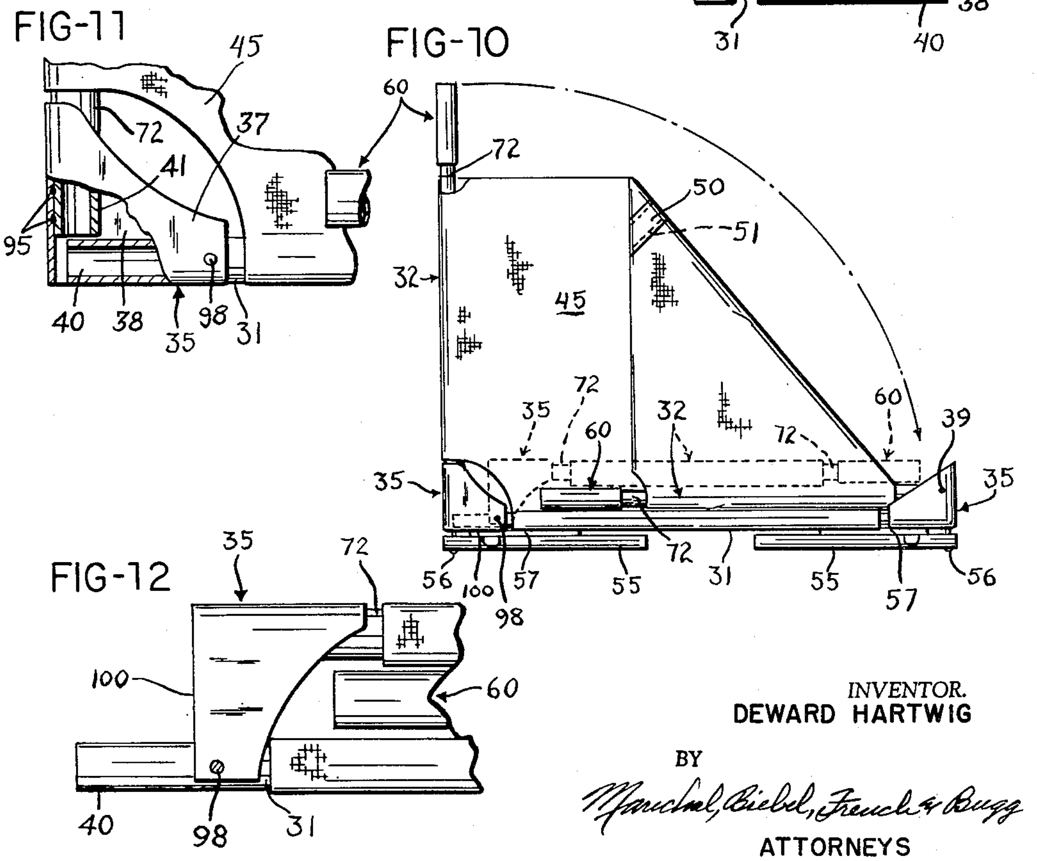
FIG. 10 illustrates the next and final folding operation succeeding that of FIG. 7, in which the right hand portion has been brought downwardly against the end members, and then the left hand portion is swung downwardly to the position indicated in dotted lines.
FIG. 11 is an enlarged detail view of the corner structure in the lower left hand corner of FIG. 10, a part of the structure being broken away.
FIG. 12 is a detail view of the corner structure at the lower left hand of FIG. 11, when the collapsing step indicated in FIG. 10 is completed.

After the tubular members 71 and 72 at the right hand side of FIG. 7 are swung inwardly against the head and foot members 31, the tubular members at the left hand side (FIG. 7) are then swung inwardly as shown in FIG. 11. In providing this last described movement the corner devices 35 are constructed as shown in FIG. 11. The side members 71, 72 (only 72 being shown in FIG. 11) are welded at 95 to the corners 35 which in turn are pivoted on pins 98 received through end members 31. The corners swing on pins 98 bringing therewith the attached doubled over tubular sections 71, 72. The described pivoting will move the parts from the position shown in FIG. 11 to the position shown in FIG. 12, the movement also being indicated by the solid to dotted line position in FIG. 10.

The side 100 (FIG. 12) of corner 35 fits over the end members 31 extending within the respective corners 35.

The final collapsed position of the cot is indicated in FIG. 2, and it is drawn in scale relatively to the spread position of the cot shown in FIG. 1. From a comparison of the relative sizes, it will be appreciated that the cot reduces substantially in size and is therefore readily storable in its compact condition without requiring excessive storage space. For this reason, it is very convenient to load and unload and transport for camping trips and the like.

To describe in sequence the operation for collapsing the cot, each of the legs 55 is first retracted on its associated pin 56, the brace 57 being initially swung or pushed off center to permit retraction of the legs alongside the end members 31. Next, the cot is bent in half on the axis connecting the two hinges 60 as shown in FIG. 5 in full lines, the bending operation being completed when the cot is in the dotted line position. During this stage of collapsing movement, the length of side members 32 is effectively halved with the tubular sections 71 and 72 being brought in side by side ralation. After the bending operation of side members 32 is completed, the cot is so proportioned that the tubular sections 71 and 72 will fit within the width of the cot equal in length to the members 31.

After the bending of members 32 is completed, the sections 71—72 on one pair of corners are swung inwardly over 71—72 at the other corners as shown in FIGS. 7–10. Tubular sections 71 and 72 pivoted to the corner members 35 on pins 39 are first swung against the end members 31 and then the other tubular sections 71, 72 are swung over by pivoting the entire corner pieces 35 on their pivot connections 98 with the end members 31. During the collapsing operation, the fabric is sufficiently pliable to fold in the various directions and contours imposed thereon by collapsing movement of the frame. In its final collapsed position, both the frame and the support legs form a bundle of side by side tubular sections separated by folds of the fabric, the final size being only a fraction of the original size.

To extend the cot from the position shown in FIG. 2 to that of FIG. 1, the steps for collapsing are simply reversed, the cot progressing through the positions starting with FIG. 2 thence to FIG. 10, by first pivoting the corners 35 on pins 98 to lift sections 71, 72, then raising the other tubular sections 71, 72 by pivoting said sections on pins 39 away from sections 31 so that the cot changes from the position shown in FIG. 10 to that of FIG. 7. The end sections 31 are then moved apart causing tubular sections 71, 72 to swing away from each other on hinges 60 until the frame is completely spread. Then the legs 55 are lowered and moved outwardly to the position of FIG. 3.

Various parts of the frame structure cooperate in stiffening the cot in the spread condition. For example, as described, the hinges 60 permit movement of the cot only about the axis indicated in FIG. 1 and thereafter the cot is stiffened by the hinges 60 against sidewise movement at the middle thereof. Also, the tubular member 71 (FIG. 6) is locked in the spread condition since the edge 79 is brought against the inner surface 81 and binds thereagainst to prevent further pivotal movement of the tubular section 71 on the pivot 73. Each of the corner constructions 35 also contributes substantially toward stiffening the frame since the tubular sections are extended generously within the corner structure 35, this tending to prevent bending movement of the tubular sections within the corners 35.

The fabric 45 is recessed surrounding each location of bending movement of the frame so as not to interfere with collapsing of the cot, the amount of recess depending upon the folds which the fabric tends to assume and this differs with different fabrics. For a canvas fabric the amount of cut back may be approximately that shown in FIG. 1.

Referring next to the embodiment shown in FIGS. 13 to 26, parts of the cot construction corresponding to parts previously described will have the same reference numeral but include further the subscript *a*.

The cot construction designated generally by reference numeral **30*a* includes a frame having tubullar end members 31*a* forming the head and foot of the cot and tubular side members 32*a* which extend between and join the head and foot members 31*a*. The cot is symmetrical about an axis midway between the ends thereof. A canvas material fabric 45*a* is secured around the periphery thereof to the frame of tubular members and is spread suitably thereby when the frame is extended. A reinforcement 50*a* consisting of a double stitched overlap section of fabric may be provided running the length of the cot to oppose sagging of the fabric. The reinforcement may further include flexible wire rope or the like 51*a***.

The head and foot members **31*a* consist of U-shaped tubular members each having spaced legs 102 and a transverse portion 103. The transverse portion 103 fits within the transverse portion 104 of a second U-shaped tubular section forming a part of the frame and having tubular sections 105 which extend along the length of the cot to form a part of the sides thereof. Ends 106 of the tubular sections 105 have jointed connections 120 with two other tubular sections 107 which are joined with legs 108 through hinges 110. The U-shaped tubular members forming the legs 102 are proportioned to fit within the sections 105 so that the legs 102** will swing upwardly as indicated in the right hand side of FIG. 15.

Figures 19, 20, 21, 22, 23, 24:
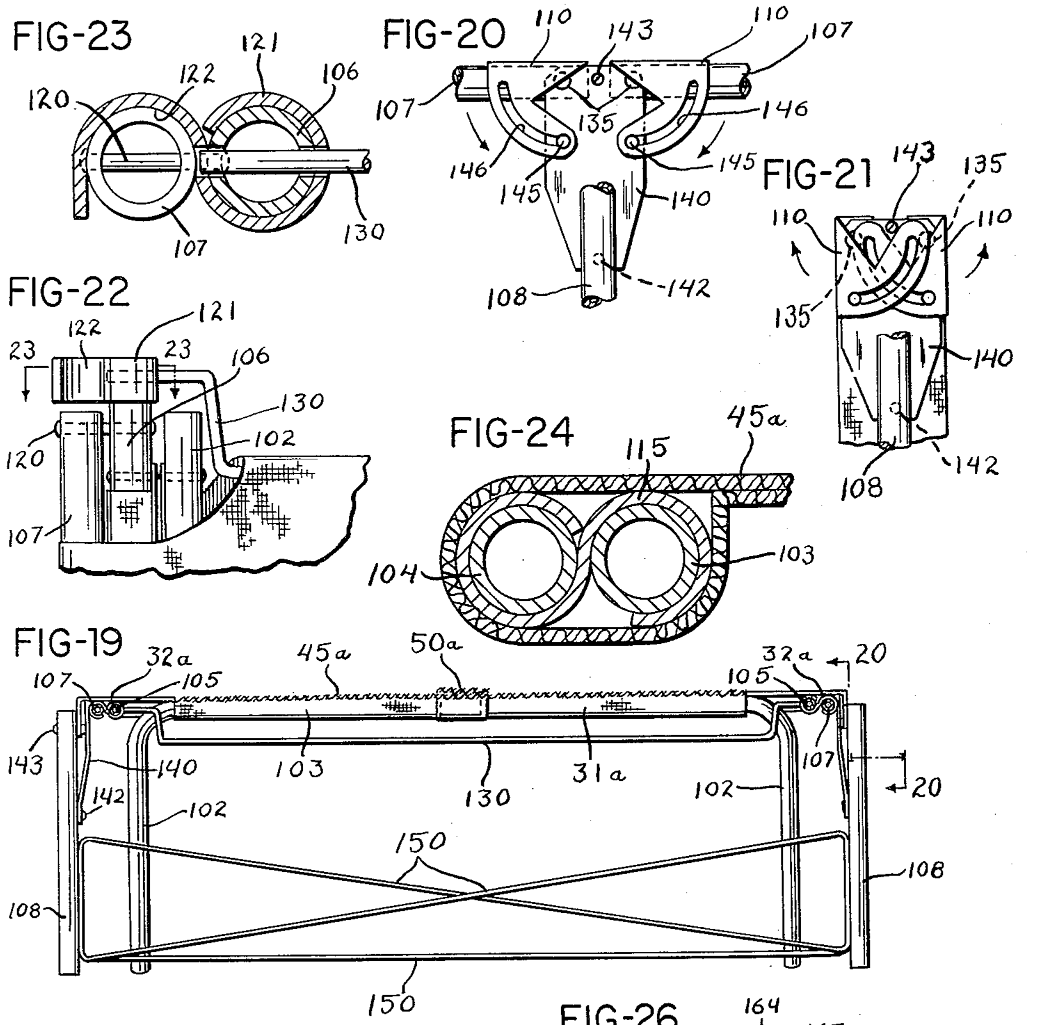
FIG. 19 is a sectional view taken on line 19—19 of FIG. 15.
FIGS. 20 and 21 are detail views of the brace between the legs at the middle of the cot, and the frame showing how the frame sections are moved inwardly during the final collapsing stage of FIG. 17, FIG. 20 being taken along line 20—20 of FIG. 19.
FIG. 22 is an enlarged fragmentary view showing the cot members after the folding operation is completed, the view being taken looking in the direction of the arrows in FIG. 14.
FIG. 23 is a sectional view taken on the line 23—23 of FIG. 22.
FIG. 24 is an enlarged sectional detail view taken on line 24—24 of FIG. 13.

The transverse portions 103 and 104 of the two U-shaped tubular sections are held together by means of clips 115 which are wound around each (FIG. 24). The portion of the clip 115 encircling transverse section 103 has the open end thereof at the bottom of the section 103 so as to minimize opening of the clip under the load to be transmitted to legs 102 through transverse portion 104. The portion of the clip 115 encircling transverse portion 104 is welded or riveted thereto to prevent turning of the clip 115 and thereby causing a distortion of the fabric **45*a*. The clip 115 maintains the transverse portions 103 and 104 in side by side relation while the cot is extended so that these portions provide mutual reinforcement against bending under the load supported by the fabric 45*a*. The tubular portions 103 and 104 form a double support against the inward pull developed along the length of the cot. The fabric 45*a* is passed over both the transverse section 103, section 104 and clips 115, and the free end of the fabric is then stitched or secured in some suitable manner to complete the fastening. A number of clips 115 are provided along the lengths of the two transverse sections 103 and 104, and the clearance between clips and sections 103 allows for turning movement of section 103** within the clip.

Between the sections 107 and the center legs 108 are the hinges 110 which are pivoted at 135 to a plate 140 secured to the legs 108 by means of rivets or the like 142 and 143. The plate 140 is offset slightly from the legs 108 (FIG. 19) to allow the hinges 110 to fit therebetween. The hinges are also constructed to lie one over the other as indicated in FIG. 21 so that tubular sections 107 are lowered to complete the collapsing movement of the cot. The ends of the tubular sections 107 are welded to the hinges 110 which in turn are pivoted at 135, and the extending movement of tubular sections 107 is limited by bottoming of the fixed pins 145 in plate 140 at the ends of slots 146 formed arcuately in the hinges 110. Likewise, during collapsing of the cot, the lowering of sections 107 is limited by bottoming of the pins 145 in the opposite ends of the slots 146.

A further means for bracing the frame of the cot consists of a series of reinforcing rods 150 which are connected between the legs 108 and are fastened thereto in some convenient manner as by welding, brazing or the like.

The legs 102 are held rigid in their retracted position by flexible braces **57*a* consisting of links pivoted to the legs 102 and to the tubular sections 105. The braces 57*a* permit the legs 102** to swing back to the position shown in FIG. 15 wherein the legs are slightly offcenter.

The weight on the cot thus tends to pivot the legs outwardly and this is resisted by the braces 57a. The links 53a and 51a are jackknifed during retraction as indicated by the dotted lines in FIG. 15.

Figures 16, 17:
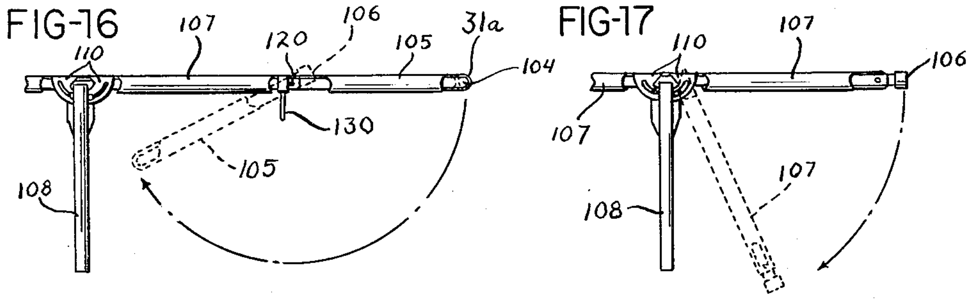
FIG. 16 is the right hand portion of the cot in FIG. 15 showing how the cot sections are folded or telescoped one within the next, starting with the endmost section of the cot.
FIG. 17 shows the next telescoping movement succeeding that of FIG. 16 in which the telescoped sections are swung downwardly against the support legs at the middle of the cot.

Next following retraction of the legs 102, the cot is collapsed by folding one section within the next, starting with the ends 31a and progressing toward the middle of the cot. Thus, the tubular sections 105 (FIG. 15) are turned under to fit within the tubular section 107 (FIG. 16). As shown in FIG. 16, the tubular section 105 and legs 102 are swung 180° to lie within tubular section 107. The tubular sections 105 contain at their ends 106 a locking means 121 (FIGS. 22 and 23) which is carried by the end 106 and has an open ended concave portion 122 which crosses over tubular section 107 to limit movement of the tubular sections 105 in a frame extending direction. Thus the sections 105 cannot pivot further relatively to sections 107 in FIGS. 13 and 15 owing to contact of sections 122 with 107. To stiffen the sides of the frame, there is a rod 130 fitted within each of the tubular sections 105 at the opposite ends of the cot, and the rod 130 is offset to lie below the level of the fabric 45a, the purpose of this being to prevent contact of the fabric 45a with the rod 130 even though there should be some sagging of the fabric 45a under load. The rod 130 also serves as a fold line for the fabric while the cot is being collapsed.

Figures 13, 14:
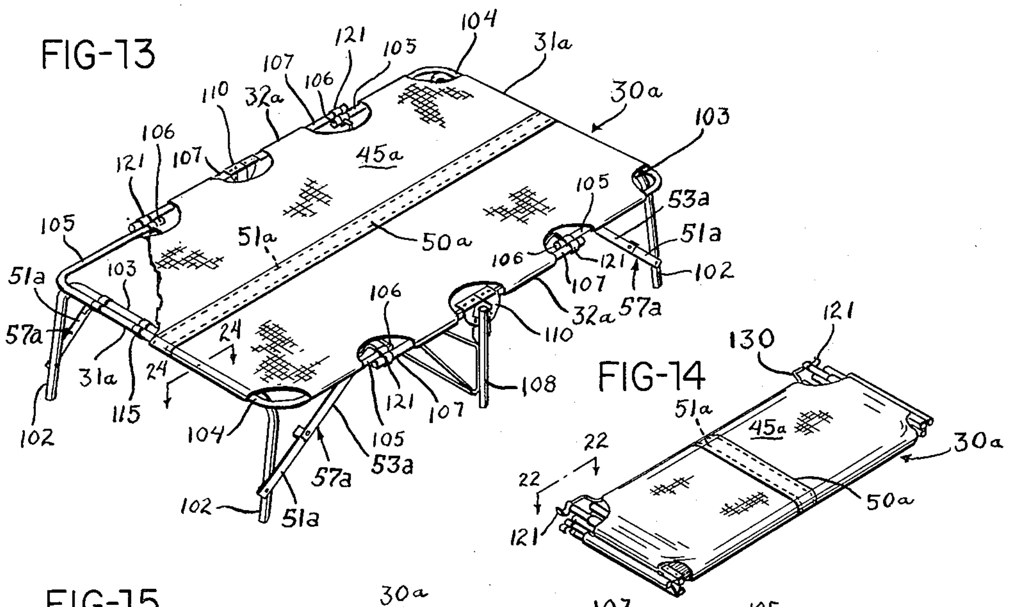
FIG. 13 is a cot construction forming a second embodiment of the invention, and shown in fully extended position ready for usage.
FIG. 14 is an isometric view of the cot shown in FIG. 13 in a fully collapsed position.
Figure 15:
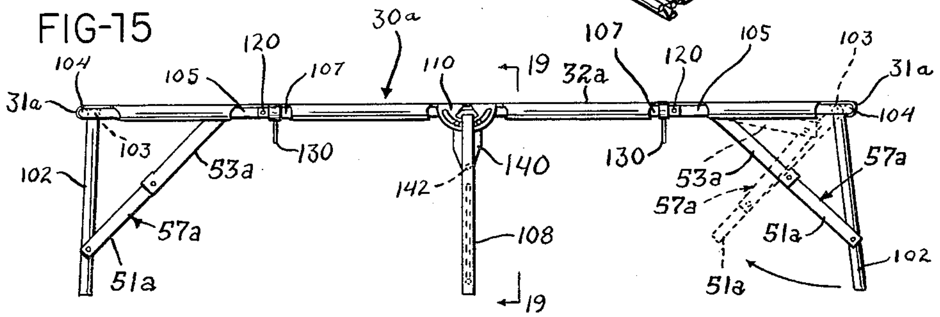
FIG. 15 is a side view of the cot shown in FIG. 13, and illustrating the retracting movement of the end legs, this being the first step in collapsing the cot.

When the cot is fully collapsed, the parts are positioned as indicated in FIG. 14 in which the length of the cot is reduced to a fraction of its former dimension. The width and height of the cot are not reduced, but since the major dimension of the cot is the length thereof, this is the most significant dimension to reduce in order to get the cot in a more convenient form for storage or transportation. For an accurate idea of the relative reduction in size of the cot, a comparison may be made of FIGS. 13 and 14 which are in the same relative proportions.

Figure 18:
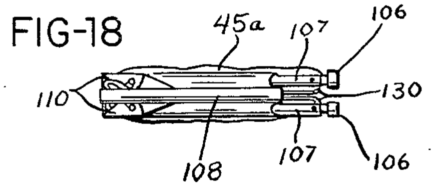
FIG. 18 is an end view of the entire fully collapsed cot, after completion of the telescoping steps of FIGS. 15, 16 and 17.

To extend the cot from the stored condition shown in FIGS. 14 and 18, the process for collapsing is simply reversed, so that starting with FIG. 17, tubular section 107 is swung upwardly to the full line position, then tubular section 105 (FIG. 16) contained within tubular section 107 is lowered and swung outwardly to the full line position, then the legs 102 are lowered from within tubular section 105 and braces 57a are locked.

Figure 26:
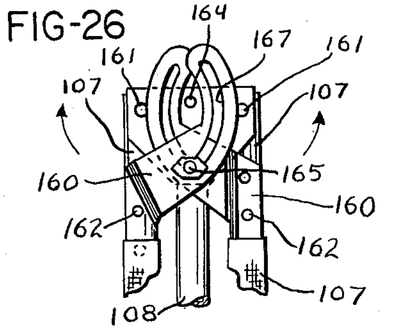
FIG. 26 shows the hinge construction of FIG. 25 when the cot is in a collapsed condition.
Figure 25:
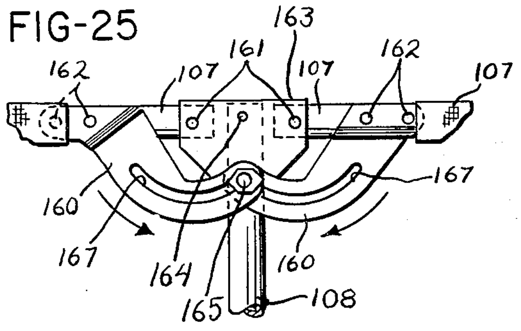
FIG. 25 is a further embodiment showing a hinge construction which may be used in place of the hinge construction shown in FIG. 20.

Referring to FIG. 25, there is shown an alternate hinge construction in which the hinges 160 are pinned or riveted at 162 to the ends of tubular sections 107 which are pivoted on pins 161 secured to plates 163 fastened one on each side of the leg 108 by rivets 164 and 165 which also serve to limit extending movement of sections 107 by bottoming in the ends of arcuate slots 167. When the cot is collapsed, the hinges 160 fit one over the other and the final position of sections 107 is determined by bottoming of the rivet 165 in the ends of the slots 167 opposite the ends contacted during extension of the cot (FIG. 26).

While the articles herein described constitute preferred embodiments of the invention, it is to be understood that this invention is not limited to these precise articles and that changes may be made therein without departing from the scope of the invention which is defined in the appended claims.

What is claimed is:

1. A collapsible cot comprising U-shaped tubular head-and-foot members, tubular side sections, means pivotally connecting said tubular sections and members to form a generally rectangular frame, said U-shaped members having the ends thereof disposed alongside the adjacent ends of said side sections to be in overlapped relation therewith when said cot is extended, said U-shaped members and sections being proportioned to lie one within the other during collapsing of said cot, means forming a part of said pivotally connecting means for securing said sections against pivotal movement when said frame is in extended position to rigidify said frame, a U-shaped vertical support member at the head and foot of said frame, means pivotally joining the cross portions of said support members to the cross portions of said U-shaped members for downwardly swing movement to provide legs for holding said cot and also to provide mutual reinforcement of said cross portions at the ends of said rectangular frame, support legs at the center of said side sections having pivot connections with said frame sections, and a foldable fabric secured at the edges thereof to said frame and spread by extendible movement of said frame.

2. A collapsible cot comprising a rectangular frame including U-shaped tubular members at the opposite ends thereof, tubular side frame sections connecting said U-shaped tubular members to form a continuous frame, said U-shaped tubular members being proportioned to nest within the tubular side sections pivotally connected thereto by folding in a vertically downward direction and through approximately 180° of movement to effect said nesting within the tubular side sections, said sections being then folded from the opposite ends of the frame toward each other at the pivot connections of said frame, and locking means between said U-shaped tubular members and said tubular side sections effecting locking engagement between said U-shaped tubular members and tubular side frame sections as the ends thereof are brought into overlapping stepped relation to restrain further movement of said tubular members when said frame is of rectangular configuration.

3. A collapsible cot comprising a substantially rectangular frame and a foldable fabric supported at the periphery thereof on said frame, said frame including U-shaped tubular end members and tubular side members joining said U-shaped tubular members together through pivotal connections therewith, a vertical supporting structure midway of said cot, a hinge connection between said tubular members and said supporting structure providing 90° movement of each tubular member toward its respective supporting structure in the final collapsing movement of said cot, a pair of spaced legs at each of the remote ends of said cots, each of said pair of legs including a transverse portion joining each leg thereof lying alongside the transverse portion of said U-shaped end members for mutual strengthening reinforcement therebetween, said legs being swung upwardly to nest entirely between the U-shaped end portions of said frame during collapsing movement of said cot, the ends of said frame being thereafter folded within the tubular sections of said frame which are thereafter brought to a final collapsed position at said hinge connection between said tubular members and said supporting structure.

4. A collapsible cot comprising a frame including U-shaped tubular members forming the ends of said frame and tubular members pivotally joined to the ends of said U-shaped members, said U-shaped members and adjoining tubular members being proportioned so that the cot frame folds from the opposite ends of said cot into successively larger sections toward the mid center of said cot and by successive inward folds in the same direction toward the center of the cot, and means pivotally connecting the adjacent tubular members at the center of the cot to provide swinging movement of said larger sections one toward the other in the finally collapsed position of said cot 5. A collapsible cot comprising a frame including U-shaped tubular members forming the ends of said frame and tubular members pivotally jointed to said U-shaped members at the ends thereof and forming the sides of said frame, said U-shaped members and adjoining portions of the sides of said frame being proportioned so that the cot folds successively inwardly in the same direction by nesting one section inwardly upon itself toward the center of said frame and is thereafter doubled together about an axis extending across the width of said cot at the center thereof the cross portions of said U-shaped members having support legs with an integrally constructed cross member which extends contiguous with the cross portion of its respective U-shaped member to provide reinforcement therefor porportioned to fit within its U-shaped member during collapsing movement of said cot, and a foldable fabric fastened at the periphery thereof to said frame to provide a suitable reclining surface.

6. A collapsible cot comprising a frame including U-shaped tubular members forming the ends of said frame, tubular members pivotally joined to said U-shaped members at the ends thereof and forming the sides of said frame, said U-shaped members and adjoining sections of the sides of said frame being proportioned so that the cot folds successively inwardly upon itself toward the center of said frame, a foldable fabric fastened at the periphery thereof to said frame to provide a suitable reclining surface, and reinforcement means extending between the sides of said frame to stiffen the sides of said frame, said reinforcement means being off-set relatively to said frame and offset from the plane of said fabric to be disposed at a lower level from the fabric when the cot is spread.

7. A collapsible cot comprising a frame including U-shaped tubular members at the ends of said cot, and additional tubular members pivotally joined to said U-shaped members at the ends thereof and forming the sides of said frame, said U-shaped members and adjoining sections of said sides being proportioned so that the cot sections starting with the ends thereof fold successively inwardly upon each other toward the center of the cot, a second pair of U-shaped tubular members at the ends of said cot proportioned to fit within said first mentioned U-shaped tubular members and hinged thereto for downward swinging movement of the legs thereof to provide vertical support for said cot at the ends thereof, and means pivotally joining said U-shaped members and said second pair of U-shaped members with the transverse portions thereof lying in side by side relation to provide mutual reinforcement against bending thereof.

8. A collapsible cot comprising a rectangular frame including articulated tubular sections forming the sides of said frame and U-shaped tubular sections forming the ends of said frame, means joining said sections together and providing for successive telescoping of said sections one within the other, locking means for holding said frame sections against further movement in the extended position of said frame to effect stiffening of the frame in its spread condition, a vertical support at each of the corners of said frame and including a transverse section interconnecting the legs across the width of said frame and lying alongside the transverse sections of the U-shaped sections of said frame to reinforce each against bending movement, said legs being swingable to bring the ends thereof downwardly to elevate the extended frame, additional vertical support legs joined to said frame at the approximate midportion of said frame, means pivotally supporting the mid portion of said frame on said additional support legs so that as the telescoped cot is folded inwardly from its end by one-quarter folds, additional folding of the two center quarters is provided, whereby said cot is reduced to one-quarter its original area, and a foldable fabric held at the periphery thereof by said frame and spread during extendible operation of said frame to provide a suitable reclining surface.

9. A collapsible cot comprising a rectangular frame including articulated tubular sections forming the sides of said frame and U-shaped tubular sections forming the ends of said frame, means joining said sections together through overlapping ends thereof and providing for successive telescoping of said sections one within the other, locking means for holding said frame sections against further movement in the extended position of said frame, a vertical support at each of the corners of said frame and including a transverse section interconnecting the legs across the width of said frame and lying alongside the transverse sections of the U-shaped sections of said frame to reinforce each against bending movement, said legs being swingable to bring the ends thereof downwardly to elevate the extended frame, additional vertical support legs joined to said frame at the approximate mid-portion of said frame, a foldable fabric held at the periphery thereof by said frame and spread during extendible operation of said frame to provide a suitable reclining surface, and flexible brace means connected between said vertical legs and said frame to rigidify said cot.

10. A collapsible cot comprising a rectangular frame including articulated tubular sections forming the sides of said frame and U-shaped tubular sections forming the ends of said frame, means joining said sections together and providing for successive telescoping of said sections one within the other, locking means for holding said frame sections against further movement in the extended position of said frame, a vertical support at each of the corners of said frame and including a transverse section interconnecting the legs across the width of said frame and lying alongside the transverse sections of the U-shaped sections of said frame to reinforce each against bending movement, said legs being swingable to bring the ends thereof downwardly to elevate the extended frame, additional vertical support legs joined to said frame at the approximate midportion of said frame, a foldable fabric held at the periphery thereof by said frame and spread during extendible operation of said frame to provide a suitable reclining surface, and means connected between the opposite sides of said frame to reinforce said frame sections against inward buckling movement, said means being displaced from said spread fabric to remain out of contact therewith.

11. A collapsible cot comprising U-shaped tubular head-and-foot members each having cross portions, two U-shaped tubular support members also having cross portions and disposed at the head and foot of said cot and movable to a vertical position wherein spaced legs of said support members provide cot elevation, means pivotally joining the two cross portions of said head-and-foot members on said support members to effect mutual reinforcement therebetween, said support members being proportioned to fold upwardly within said head-and-foot members, two additional cot members having hinge connection with said head-and-foot members and proportioned to receive a respective head-and-foot member therein together with its support member, and a center support means also having support legs and providing a hinge connection with each of said two additional cot members whereby said additional members are doubled over one against the other to form a collapsed cot configuration of substantially no greater outline than the outline of one of said two additional members.

References Cited in the file of this patent

UNITED STATES PATENTS

| | | |
|---|---|---|
| 1,369,173 | Heyser | Feb. 22, 1921 |
| 1,541,105 | Broome | June 9, 1925 |
| 1,607,572 | Soderquist | Nov. 16, 1926 |
| 1,608,291 | Basford | Nov. 23, 1926 |
| 2,650,373 | Zeller et al. | Sept. 1, 1953 |
| 2,756,441 | Shannon | July 31, 1956 |
| 2,767,776 | Allen | Oct. 23, 1956 |
| 2,866,208 | Vanderminden | Dec. 30, 1958 |

FOREIGN PATENTS

| | | |
|---|---|---|
| 556,252 | Italy | Feb. 4, 1957 |